(12) United States Patent
Ge et al.

(10) Patent No.: US 10,097,656 B2
(45) Date of Patent: Oct. 9, 2018

(54) CONTROL METHOD AND APPARATUS FOR PUBLISH/SUBSCRIBE SYSTEMS

(71) Applicant: International Business Machines Corporation, Armonk, NY (US)

(72) Inventors: Yi Ge, Beijing (CN); Li Li, Beijing (CN); Ju Wei Shi, Beijing (CN); Qi Yu, Beijing (CN); Guotao Zhao, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 263 days.

(21) Appl. No.: 14/914,769

(22) PCT Filed: Aug. 21, 2014

(86) PCT No.: PCT/CN2014/084897
§ 371 (c)(1),
(2) Date: Feb. 26, 2016

(87) PCT Pub. No.: WO2015/027853
PCT Pub. Date: Mar. 5, 2015

(65) Prior Publication Data
US 2016/0205210 A1    Jul. 14, 2016

(30) Foreign Application Priority Data
Aug. 30, 2013    (CN) .......................... 2013 1 0389492

(51) Int. Cl.
*G06F 15/16* (2006.01)
*H04L 29/08* (2006.01)
(Continued)

(52) U.S. Cl.
CPC ................ *H04L 67/26* (2013.01); *G06F 9/00* (2013.01); *H04L 12/1859* (2013.01);
(Continued)

(58) Field of Classification Search
CPC ..... H04L 67/26; H04L 51/14; H04L 12/1859; H04L 67/00; H04L 51/00; G06F 9/00; G06Q 30/02
See application file for complete search history.

(56) References Cited

U.S. PATENT DOCUMENTS 7,535,927 B1 * 5/2009 Northrup .................. G06F 9/54
370/469
7,822,801 B2   10/2010 Zhao et al.
(Continued)

FOREIGN PATENT DOCUMENTS

CN    1953426 A      4/2007
CN    101321189 A    12/2008
(Continued)

OTHER PUBLICATIONS

Alex K.Y. Cheung, Dynamic load balancing in distributed content-based publish/subscribe, Department of Electrical and Computer Engineering, University of Toronto, Lecture Notes in Computer Science, 2006, 2-3, vol. 4290, Springer Berlin Heidelberg, Toronto, Ontario, Canada.
(Continued)

*Primary Examiner* — Krisna Lim
(74) *Attorney, Agent, or Firm* — Rabin Bhattacharya (57) ABSTRACT

The present invention provides a method and apparatus of controlling subscription requests, which can be used in a publish/subscribe engine. The method includes parsing a received subscription request into a predicate expression; determining an occurrence probability of the subscription request based on occurrence probabilities of predicates in the predicate expression; estimating a message increment to be caused by the subscription request based on a message publishing rate associated with the subscription request and on the occurrence probability of the subscription request;
(Continued)

and controlling a quality of service of messages based on the estimated message increment.

16 Claims, 4 Drawing Sheets

(51) Int. Cl.
    *G06F 9/00*     (2006.01)
    *H04L 29/12*     (2006.01)
    *H04L 12/18*     (2006.01)
    *H04L 12/58*     (2006.01)
    *G06Q 30/02*     (2012.01)

(52) U.S. Cl.
    CPC .............. *H04L 51/14* (2013.01); *H04L 61/00* (2013.01); *H04L 67/00* (2013.01); *G06Q 30/02* (2013.01)

(56) References Cited

U.S. PATENT DOCUMENTS

| | | |
|---|---|---|
| 2008/0306888 A1 | 12/2008 | Dorai et al. |
| 2009/0116380 A1 | 5/2009 | Santiago et al. |
| 2010/0045426 A1* | 2/2010 | Kakuta .................. G06Q 10/00 340/5.21 |
| 2012/0215832 A1 | 8/2012 | Bhogal et al. |
| 2012/0226797 A1 | 9/2012 | Ghosh et al. |
| 2013/0067492 A1 | 3/2013 | Fidler et al. |
| 2013/0132582 A1 | 5/2013 | Kim et al. |
| 2016/0205210 A1* | 7/2016 | Ge ............................ G06F 9/00 709/217 |

FOREIGN PATENT DOCUMENTS

| | | |
|---|---|---|
| CN | 101904140 A | 12/2010 |
| CN | 102024053 A | 4/2011 |
| CN | 10257171 A | 7/2012 |
| CN | 103220328 A | 7/2013 |
| WO | 2009061667 A1 | 5/2009 |

OTHER PUBLICATIONS

IBM, A mechanism for avoiding unnecessary publications in a publish/subscribe environment, IP.com, IPCOM000020707D, Dec. 10, 2003, https://priorart.ip.com/IPCOM/000020707.

* cited by examiner

CONTROL METHOD AND APPARATUS FOR PUBLISH/SUBSCRIBE SYSTEMS

CROSS-REFERENCE TO RELATED APPLICATION

This application claims priority under 35 U.S.C. § 371 from PCT Application PCT/CN2014/084897, filed on Aug. 21, 2014, which claims priority from Chinese Patent Application No. 201310389492.3, filed Aug. 30, 2013, the contents of which are incorporated herein by reference.

FIELD OF THE INVENTION

The present invention relates to a publish/subscribe system, and more specifically, to a control method and apparatus for publish/subscribe systems.

BACKGROUND OF THE INVENTION

Existing publish/subscribe (pub/sub) systems generally include publishers, subscribers and pub/sub engines. The publishers are producers of information, and the subscribers are consumers of information. One party of the publishers and the subscribers can or can not know the existence of the other party thereof, i.e., the publishers and the subscribers are in a loose coupling relationship. The pub/sub engines provide functions of storage and forwarding, so as to route between the publishers and subscribers data carrying event information. Typically, the publishers publish event information through event publish application program interfaces, while the subscribers issue subscription requests and receive subscribed information through subscribe application program interfaces.

It is to be noted that in a pub/sub system, the production of data can be pre-estimated while the consumption of data cannot be pre-estimated. Therefore, for a pub/sub system with real-time requirements, it is especially necessary to control subscription requests so that once a subscription request is received, the quality of service QoS with real-time requirements can be ensured.

There exists in the prior art a topic-based pub/sub model, by means of which real-time requirements can be solved to some extent. By means of the topic-based pub/sub model, there is defined how to publish and subscribe to a request to one of content nodes. Each of the content nodes is referred to as a topic. Usually, industry experts build a topic tree in advance based on the content nodes. Topics can be regarded as transmission media of messages, the publishers publish messages to topics, and the subscribers subscribe to requests from topics. The topics make it possible that message subscribers and message publishers keep independent of each other and transfer messages without contact. However, if the publishers of information involve various types of equipments (e.g. in the current Internet of Things) and publish a multitude of information, it is impossible to build complex topic trees, and let alone apply the existing topic-based pub/sub technical solutions.

Content-based pub/sub systems in the prior art are more flexible than the topic-based pub/sub systems. In the content-based pub/sub systems, topic trees do not need to be predefined and publishers do not need to know to which topic node data will be published. The subscribers can receive part of messages of the publishers by defining message content-based filtering rules. Compared with the topic-based pub/sub systems, in the content-based pub/sub systems, the data consumption of each subscriber is more dynamically varying, so that it is more difficult to ensure the quality of service QoS with real-time requirements. However, in the field of Internets of Things, for the purpose of low power consumption, sensors as publishers can only make simple logical computation but cannot perform complex operations. Therefore, the existing content-based pub/sub technical solutions also cannot be applied.

In view of the above, there is still room for improvement in the prior art. Therefore, there is a need to provide a solution for controlling a subscription request, which can be used in a pub/sub engine to improve the quality of service.

SUMMARY OF THE INVENTION

According to a first aspect of the present invention, there is provided a method for controlling subscription requests. The method can be used in a publish/subscribe engine and includes parsing a received subscription request into a predicate expression; determining an occurrence probability of the subscription request based on occurrence probabilities of predicates in the predicate expression; estimating a message increment to be caused by the subscription request based on a message publishing rate associated with the subscription request and on the occurrence probability of the subscription request; and controlling a quality of service of messages based on the estimated message increment.

According to a second aspect of the present invention, there is provided an apparatus for controlling subscription requests. The apparatus can be used in a publish/subscribe engine and includes: a parsing module configured to parse a received subscription request into a predicate expression; a first determining module configured to determine an occurrence probability of the subscription request based on occurrence probabilities of predicates in the predicate expression; a second determining module configured to estimate a message increment to be caused by the subscription request based on a message publishing rate associated with the subscription request and on the occurrence probability of the subscription request; and a control module configured to control a quality of service of messages based on the estimated message increment.

The method and apparatus of the present invention can be used in a publish/subscribe engine to improve a quality of service.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION OF THE PREFERRED EMBODIMENTS

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

As will be appreciated by one skilled in the art, aspects of the present invention can be embodied as a system, method or computer program product. Accordingly, aspects of the present invention can take the form of an entirely hardware embodiment, an entirely software embodiment (including firmware, resident software, micro-code, etc.) or an embodiment combining software and hardware aspects that can all generally be referred to herein as a "circuit," "module" or "system." Furthermore, aspects of the present invention can take the form of a computer program product embodied in one or more computer readable medium(s) having computer readable program code embodied thereon.

Any combination of one or more computer readable medium(s) can be utilized. The computer readable medium can be a computer readable signal medium or a computer readable storage medium. A computer readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium can be any tangible medium that can contain, or store a program for use by or in connection with an instruction execution system, apparatus, or device.

A computer readable signal medium can include a propagated data signal with computer readable program code embodied therein, for example, in baseband or as part of a carrier wave. Such a propagated signal can take any of a variety of forms, including, but not limited to, electromagnetic, optical, or any suitable combination thereof. A computer readable signal medium can be any computer readable medium that is not a computer readable storage medium and that can communicate, propagate, or transport a program for use by or in connection with an instruction execution system, apparatus, or device.

Program code embodied on a computer readable medium can be transmitted using any appropriate medium, including but not limited to wireless, wireline, optical fiber cable, RF, etc., or any suitable combination of the foregoing.

Computer program code for carrying out operations for aspects of the present invention can be written in any combination of one or more programming languages, including an object oriented programming language such as Java, Smalltalk, C++ or the like and conventional procedural programming languages, such as the "C" programming language or similar programming languages. The program code can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions can also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
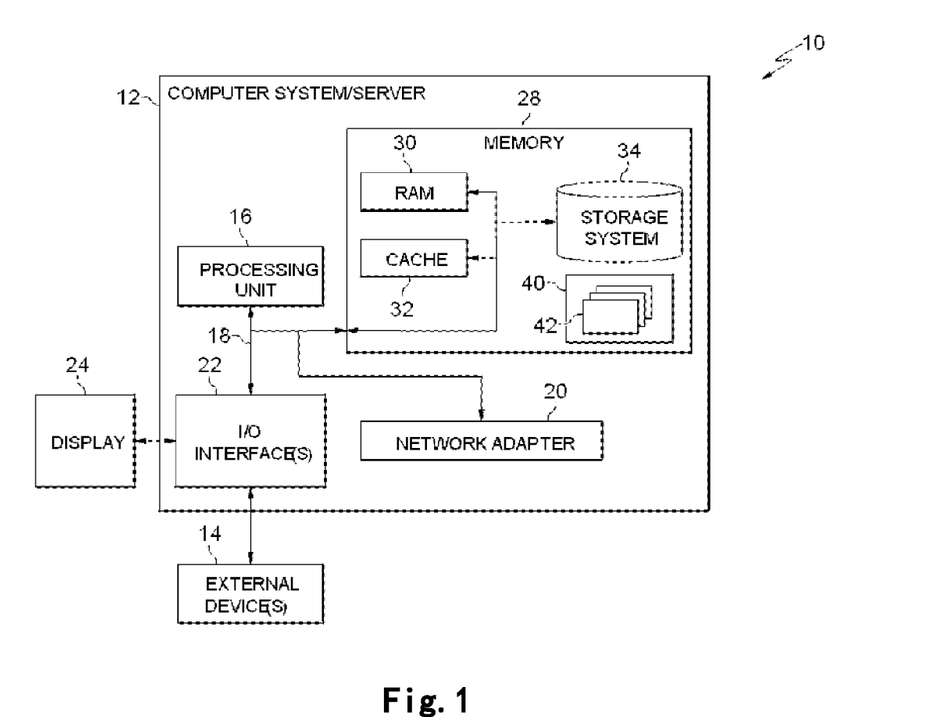
FIG. 1 shows a block diagram of an exemplary computer system/server 12 which is applicable to implement the embodiments of the present invention.

Referring now to FIG. 1, in which an exemplary computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 can include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media can be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 can further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 can include at least one program product having a set (e.g., at least one) of program modules that are configured to carry out the functions of embodiments of the invention.

Program/utility 40, having a set (at least one) of program modules 42, can be stored in memory 28 by way of example, and not limitation, as well as an operating system, one or more application programs, other program modules, and program data. Each of the operating system, one or more application programs, other program modules, and program data or some combination thereof, can include an implementation of a networking environment. Program modules 42 generally carry out the functions and/or methodologies of embodiments of the invention as described herein.

Computer system/server 12 can also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
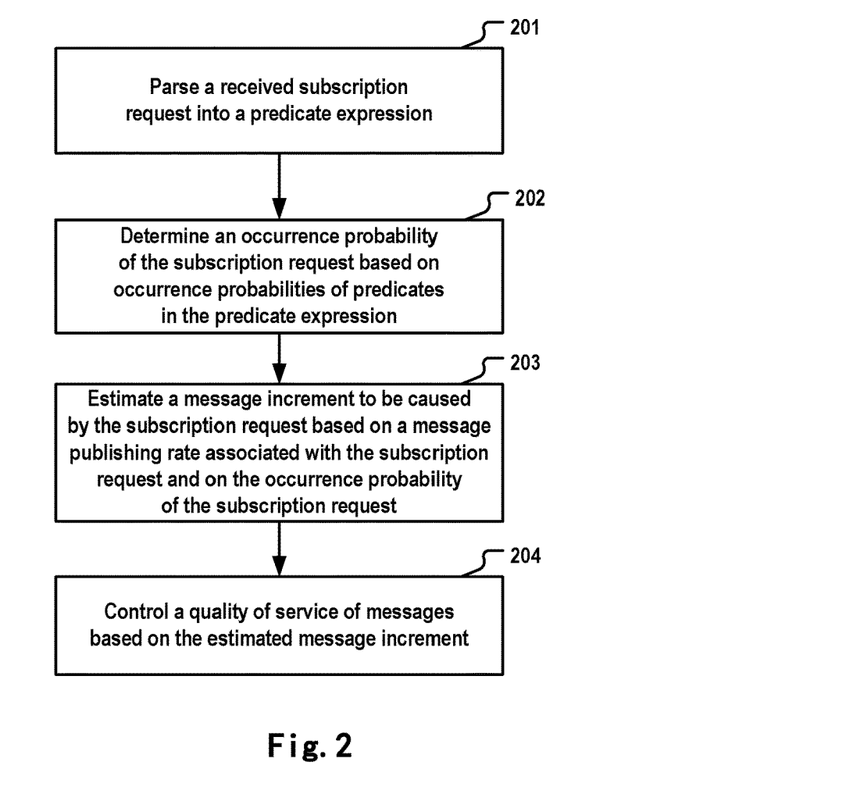
FIG. 2 shows a flowchart of a method for controlling subscription requests according to an embodiment of the present invention.

Reference is now made to FIG. 2, which shows a flowchart of a method for controlling subscription requests according to an embodiment of the present invention. The method can be used in a pub/sub engine. As shown in FIG. 2, the method at least includes the following steps.

In step 201, a received subscription request is parsed into a predicate expression.

The subscription request is used for describing a computer-readable statement of content to which a user wants to subscribe. The subscription request can be described by using such judgment statements as "if . . . then" or be expressed by using an SQL query statement, or other approaches for describing subscription requests as anticipated by those skilled in the art.

For example, if a subscription request of user A is to subscribe to messages about all males who are taller than 180 cm or who are lighter than 85 kg, in an embodiment the subscription request can be described by using the "if . . . then" judgment statement as: if (sex=male and (height>180 cm or weight<85 kg)) then Dispatch to A. In another embodiment, the subscription request is defined by using an SQL query statement, for example, SELECT*WHERE (sex=male and (height>180 cm or weight<85 kg)).

Upon receiving the subscription request, a condition judgment expression "sex=male and (height>180 cm or weight<85 kg)" is extracted based on the "if . . . then" statement or SQL statement. Next, the extracted expression is parsed into a predicate expression including predicates and logical operators ("and" and "or"). A predicate is the smallest unit indicating the nature, attribute and other information of an object. In the present application, a predicate is a triple including an attribute field, a comparison operator and a reference value, such as "sex=male", "height>180 cm" in this example.

Figure 3A:
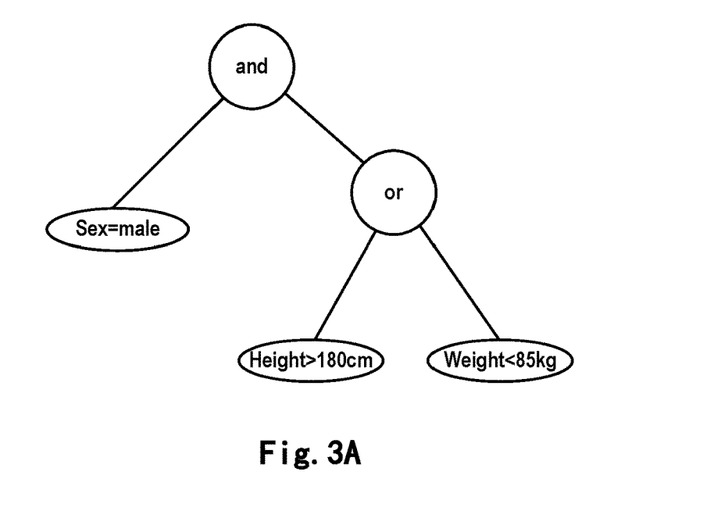
FIG. 3A shows a schematic binary tree representation of a predicate expression according to an embodiment of the present invention.

As shown in FIG. 3A, in an embodiment, priorities for computing among predicates in the predicate expression can be described by using a binary tree, in which leaf nodes are predicates and father nodes are logical operators. The predicate expression as shown in FIG. 3A has a two-layer binary tree structure.

In step 202, an occurrence probability of the subscription request is determined based on occurrence probabilities of all predicates in the predicate expression.

In an embodiment, an occurrence probability of a predicate is determined based on an attribute contained in the predicate and historical probability distribution of the attribute. Each attribute has its respective historical probability distribution that can reflect probability distribution of values of the attribute.

In an embodiment, determining the historical probability distribution of an attribute includes in sub-step 1, receiving in real time a message published by a publisher and making statistics of attributes and values of the attributes contained in the published message; and sub-step 2, determining a historical probability distribution of each of the attributes based on statistical results. In sub-step 1, in response to receiving a published message, attributes and respective values of the attributes contained in the message are determined; and then, statistical values in an interval to which the values of the attributes belong are updated, for example, by increasing a count value by 1, or by further calculating a proportion value of each interval. By means of the above operations, a historical probability distribution of values of each of the attributes is obtained based on all the historically published information which is received. With this embodiment, the pub/sub system can build in real time a probability distribution of each of the attributes, thereby obtaining historical probability distribution(s) of desired attribute(s) rapidly.

In another embodiment, the published message is scanned temporarily, and then historical probability distribution(s) of desired attribute(s) is/are determined. This embodiment is feasible but proceeds slowly.

Figure 3B:
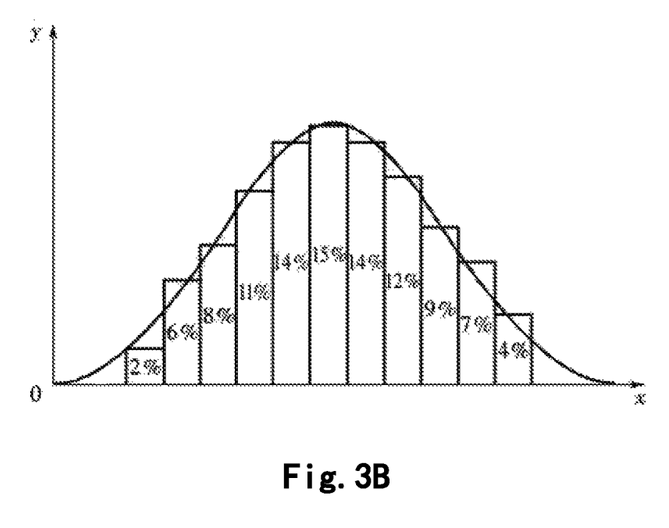
FIG. 3B shows a schematic view for determining a probability distribution of height by taking an attribute "height" as an example according to an embodiment of the present invention.

FIG. 3B illustrates in detail, by taking the attribute "height" as an example, how to determine a historical probability distribution of the attribute "height". As shown in FIG. 3B, the horizontal axis x indicates multiple intervals into which values of the height are divided (specific values of height intervals are not shown). The multiple intervals can be evenly or unevenly spaced. For example, regarding a middle part, finer-grained division can be adopted, while regarding two ends of the distribution curve, coarser-grained division can be adopted. In this embodiment, the vertical axis indicates a proportion value of a published message having heights in a certain interval. For example, when a published message which is received contains information on a height of 175, then statistics is made of statistical values of the height of an interval between 170 and 180, e.g. increased by 1, and then a proportion of messages of each interval is determined, e.g. 14%.

In an improved embodiment, in order to rapidly find a corresponding part and make statistics thereof, a hash structure is applied in determining a probability distribution of an attribute, to make statistics of values of attributes in a message.

In calculating a generation probability of each predicate, the generation probability of the predicate is calculated based on a probability distribution of an attribute involved in the predicate. Further illustration is presented in conjunction with the above-described example. Specifically, subscription request A's occurrence probability P(Subscription A) is calculated with a formula P(Subscription A)=P (sex=male) *P (height>180 cm)+P (sex=male)*P (weight<85 kg), where P (sex=male) denotes a probability that sex is male, P (height>180 cm) denotes a probability that height is greater than 180 cm, and P (weight<85 kg) denotes a probability that weight is less than 85 kg. Upon determining the probability distribution of each attribute, it is not difficult to calculate a probability of each predicate, which is not described in detail herein.

In order to further simplify the calculation of an occurrence probability of the subscription request, in an improved embodiment, the step 202 further includes converting the parsed predicate expression into a logically equivalent disjunctive normal form (DNF); and then, determining the occurrence probability of the subscription request based on occurrence probabilities of all predicates in the disjunctive normal form.

A logical expression is regarded as a disjunctive normal form if and only if the logical expression is a disjunction of one or more conjunctions of one or more predicates, where the disjunction refers to connecting several predicates by an "OR" operator, and the conjunction refers to connecting several predicates by an "AND" operator. Specifically, a logical expression can be converted into a logically equivalent disjunctive normal form by using the double negative elimination, De Morgan's laws, the distributive law and the like. As appreciated by those skilled in the art, all logical expressions can be converted into respective disjunctive normal forms.

By converting the predicate expression into a disjunctive normal form, the predicate expression becomes a one-layer logical expression including of the "AND" operator and the "OR" operator, thereby simplifying the computation of a message increment caused by an estimation of the subscription request in a subsequent step.

Regarding the foregoing example, through the step as described above, the subscription request is converted into the disjunctive normal form for normalization: (sex=male and height>180 cm) or (sex=male and weight<85 kg).

In an embodiment, all the parsed predicate expressions can be converted; and for an expression that is already a disjunctive normal form, it remains unchanged after the conversion. In another embodiment, first, it is determined whether the expression is a disjunctive normal form or not, and then it is determined whether to convert. Specifically, it is determined based on a definition of the disjunctive normal form whether a predicate expression is a disjunctive normal form or not, and if yes, the conversion is performed. For example, as defined, an expression having more than one layer is not a disjunctive normal form and thus it needs to be converted.

In step 203, a message increment to be caused by the subscription request is estimated based on a message publishing rate associated with the subscription request and the occurrence probability of the subscription request.

According to an embodiment, the message increment possibly caused by a subscription request A (Subscription A) is estimated with a formula R(Subscription A)=R(msg)*P (Subscription A), where R(msg) represents a message publishing rate associated with the Subscription A, P(Subscription A) represents a occurrence probability of Subscription A, and the message increment possibly caused by Subscription A can be obtained by the multiplication of R(msg) and P(Subscription A).

In step 204, a quality of service of messages is controlled based on the estimated message increment.

By comparing the evaluated message increment with the system's remaining throughput capacity or the subscriber's receiving capacity, the subscription request is processed accordingly to enable the control of the quality of service of messages.

In an embodiment, controlling the quality of service of messages based on a comparison of the message increment to be caused by the subscription request with the remaining throughput capacity of the pub/sub engine can include rejecting the subscription request if the message increment to be caused by the subscription request is greater than the remaining throughput capacity of the pub/sub engine; and otherwise accepting the subscription request.

In another embodiment, controlling the quality of service of messages based on a comparison of the message increment to be caused by the subscription request with the receiving capacity of the subscriber of the subscription request can include rejecting the subscription request if the message increment to be caused by the subscription request is greater than the receiving capacity of the subscriber of the subscription request; and otherwise accepting the subscription request.

Figure 4:
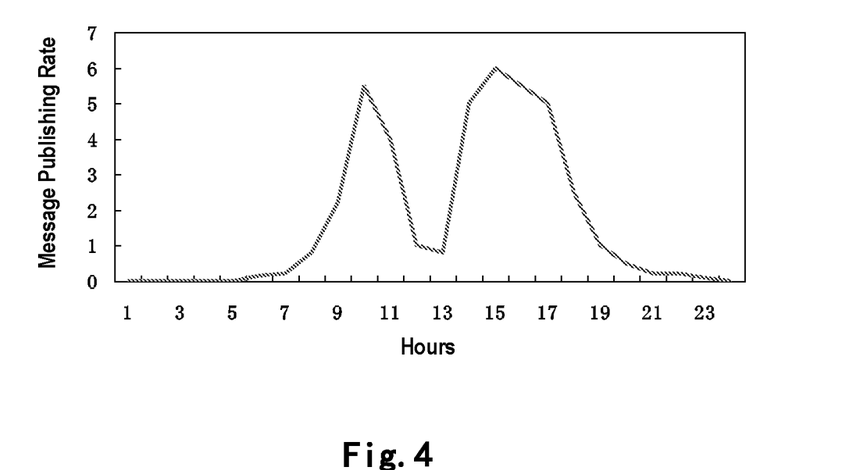
FIG. 4 shows a flowchart of a connected vehicle Msg profile in the Internet of Vehicles according to an embodiment of the present invention.

The message publishing rate R(msg) is usually constant. However, in another embodiment, R(msg) is inconstant, and the message publishing rate usually conforms to a regulated distribution in a certain period. For example, FIG. 4 illustrates a connected vehicle Msg profile in the Internet of Vehicles. As shown in FIG. 4, in scenarios of intelligent transportation systems, the vertical axis represents a message publishing rate (in a unit of k messages per second) which presents morning peak and evening peak characteristics in the time (in a unit of hour) represented by the horizontal axis. In the embodiment as shown in FIG. 4, the message increment can be estimated by using Formula 1 as below.

$$\Sigma \int_{t1}^{t2} R_j(t) * P(i) dt \quad \text{(Formula 1)}$$

In Formula 1, $R_j(t)$ is a message publishing rate profile for a message type j, and P(i) is an occurrence probability of corresponding subscription request i.

In an improved embodiment, a buffer space can be set for subscribers for buffering messages to which the subscribers have subscribed. Therefore, controlling the quality of service of messages based on the estimated message increment includes causing a difference between an amount of messages sent in a certain time interval and an amount of messages that the subscriber can receive to be less than the set buffer space. Next, further illustration is presented with Formula 2.

$$\Sigma \int_{t1}^{t2} R_j(t) * P(i) dt - R(rec) * (t2-t1) < \text{buffer\_size} \quad \text{(Formula 2)}$$

In Formula 2, R(rec) represents a subscriber's remaining receivable capacity, and buffer_size represents a set buffer size. Therefore, Formula 2 represents that in a time interval between t1 and t2, a difference between a message increment caused by a certain subscription request and the amount of messages that the subscriber can receive should be less than the set buffer size. If the difference is less than the set buffer size, the subscription request is accepted, and otherwise the subscription request is rejected, thereby ensuring the quality of service.

Figure 5:
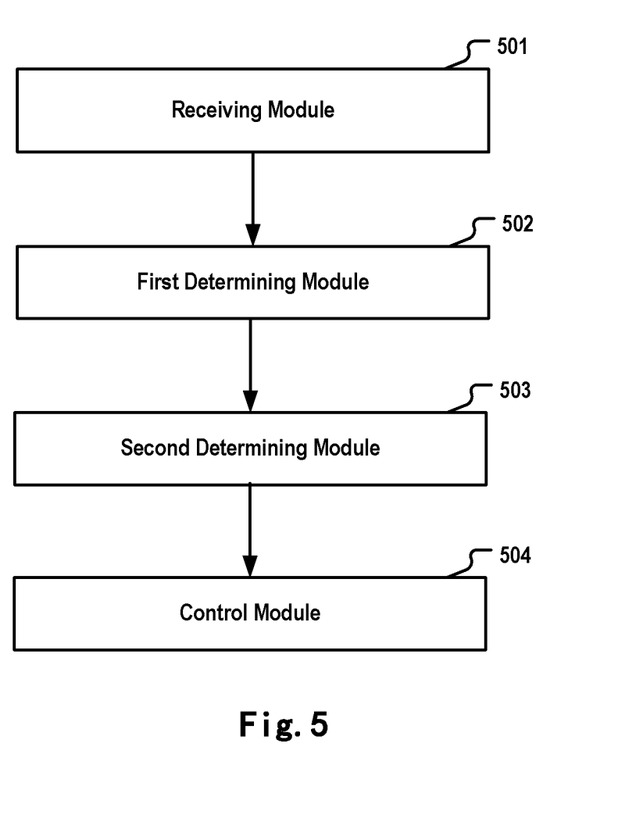
FIG. 5 shows a schematic view of an apparatus for controlling subscription requests according to an embodiment of the present invention.

FIG. 5 shows a schematic view of an apparatus for controlling subscription requests according to an embodiment of the present invention. The apparatus can be used in a publish/subscribe engine. The apparatus includes a receiving module 501 configured to parse a received subscription request into a predicate expression; a first determining module 502 configured to determine an occurrence probability of the subscription request based on occurrence probabilities of predicates in the predicate expression; a second determining module 503 configured to estimate a message increment to be caused by the subscription request based on a message publishing rate associated with the subscription request and on the occurrence probability of the subscription request; and a control module 504 configured to control a quality of service of messages based on the estimated message increment.

In an embodiment, the first determining module 502 includes a module configured to convert the parsed predicate expression into a logically equivalent disjunctive normal form; and a module configured to determine the occurrence probability of the subscription request based on occurrence probabilities of all predicates in the disjunctive normal form.

In an embodiment, an occurrence probability of each of the predicates is determined based on an attribute contained in each of the predicates and a historical probability distribution of the attribute.

In an embodiment, the apparatus as shown in FIG. 5 further includes a module configured to receive in real time a message published by a publisher and to make statistics of attributes contained in the published message and values of the attributes; and a module configured to determine the historical probability distribution of each of the attributes based on statistical results.

In an embodiment, the control module 504 includes at least one of: a module configured to control the quality of service of messages based on a comparison of the message increment to be caused by the subscription request with a remaining throughput capacity of the publish/subscribe engine; and a module configured to control the quality of service of messages based on a comparison of the message increment to be caused by the subscription request with a receiving capacity of a subscriber of the subscription request. In an improved embodiment, the module configured to control the quality of service of messages based on a comparison of the message increment to be caused by the subscription request with a receiving capacity of a subscriber of the subscription request includes a module configured to reject the subscription request if the message increment to be caused by the subscription request is greater than the receiving capacity of the subscriber and to otherwise accept the subscription request. In another improved embodiment, the module configured to control the quality of service of messages based on a comparison of the message increment to be caused by the subscription request with a remaining throughput capacity of the publish/subscribe engine includes a module configured to reject the subscription request if the message increment to be caused by the subscription request is greater than the remaining throughput capacity of the publish/subscribe engine and to otherwise accept the subscription request.

In an embodiment, the apparatus as shown in FIG. 5 further includes a module configured to set a buffer space for subscribers; wherein the control module includes a module configured to cause a difference between an amount of messages sent during a certain time interval and an amount of messages that a subscriber can receive to be less than the buffer space set by the module configured to set a buffer space for subscribers.

In an embodiment, the message publishing rate is constant or regularly varies.

The flowchart and block diagrams in the Figures illustrate the architecture, functionality, and operation of possible implementations of systems, methods and computer program products according to various embodiments of the present invention. In this regard, each block in the flowchart or block diagrams can represent a module, segment, or portion of code, which includes one or more executable instructions for implementing the specified logical function(s). It should also be noted that, in some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of controlling subscription requests, which can be used in a publish/subscribe engine, the method comprising:

parsing a received subscription request into a predicate expression;

an occurrence probability of the subscription request based on occurrence probabilities of predicates in the predicate expression;
estimating a message increment to be caused by the subscription request based on a message publishing rate associated with the subscription request and on the occurrence probability of the subscription request; and
controlling a quality of service of messages based on the estimated message increment.

2. The method according to claim 1, wherein determining an occurrence probability of the subscription request based on occurrence probabilities of predicates in the predicate expression comprises:
converting the parsed predicate expression into a logically equivalent disjunctive normal form; and
determining the occurrence probability of the subscription request based on occurrence probabilities of all predicates in the disjunctive normal form.

3. The method according to claim 1, wherein an occurrence probability of each of the predicates is determined based on an attribute contained in each of the predicates and a historical probability distribution of the attribute.

4. The method according to claim 3, further comprising:
receiving in real time a message published by a publisher and making statistics of attributes contained in the published message and values of the attributes; and
determining the historical probability distribution of each of the attributes based statistical results.

5. The method according to claim 1, wherein controlling the quality of service of messages based on the estimated message increment comprises at least one of:
controlling the quality of service of messages based on a comparison of the message increment to be caused by the subscription request with a remaining throughput capacity of the publish/subscribe engine; and
controlling the quality of service of messages based on a comparison of the message increment to be caused by the subscription request with a receiving capacity of a subscriber of the subscription request.

6. The method according to claim 5,
wherein controlling the quality of service of messages based on a comparison of the message increment to be caused by the subscription request with a receiving capacity of a subscriber of the subscription request comprises:
rejecting the subscription request if the message increment to be caused by the subscription request is greater than the receiving capacity of the subscriber; and
otherwise accepting the subscription request; and
wherein controlling the quality of service of messages based on a comparison of the message increment to be caused by the subscription request with a remaining throughput capacity of the publish/subscribe engine comprises:
rejecting the subscription request if the message increment to be caused by the subscription request is greater than the remaining throughput capacity of the publish/subscribe engine; and
otherwise accepting the subscription request.

7. The method according to claim 1, further comprising:
setting a buffer space for subscribers;
wherein controlling the quality of service of messages based on the estimated message increment comprises causing a difference between an amount of messages which are sent during a certain time interval and an amount of messages that a subscriber can receive to be less than the set buffer space.

8. The method according to claim 1, wherein the message publishing rate is constant or regularly varies.

9. A subscription requests control apparatus, which can be used in a publish/subscribe engine, the apparatus comprising:
a received subscription request parsed into a predicate expression;
an occurrence probability of the subscription request determined based on occurrence probabilities of predicates in the predicate expression;
a message increment to be estimated caused by the subscription request based on a message publishing rate associated with the subscription request and on the occurrence probability of the subscription request; and
a quality of service of messages controlled based on the estimated message increment.

10. The apparatus according to claim 9, wherein the occurrence probability of the subscription request comprises:
the parsed predicate expression converted into a logically equivalent disjunctive normal form; and
the occurrence probability of the subscription request determined based on occurrence probabilities of all predicates in the disjunctive normal form.

11. The apparatus according to claim 9, wherein an occurrence probability of each of the predicates is determined based on an attribute contained in each of the predicates and a historical probability distribution of the attribute.

12. The apparatus according to claim 11, further comprising:
a message published by a publisher in real time and statistics of attributes contained in the published message and values of the attributes in real time; and
the historical probability distribution of each of the attributes determined based on statistical results.

13. The apparatus according to claim 9, wherein the quality of service of messages comprises at least one of:
the quality of service of messages controlled based on a comparison of the message increment to be caused by the subscription request with a remaining throughput capacity of the publish/subscribe engine; and
the quality of service of messages controlled based on a comparison of the message increment to be caused by the subscription request with a receiving capacity of a subscriber of the subscription request.

14. The apparatus according to claim 13,
wherein the quality of service of messages are controlled based on a comparison of the message increment to be caused by the subscription request with a receiving capacity of a subscriber of the subscription request comprises: the subscription request is rejected if the message increment to be caused by the subscription request is greater than the receiving capacity of the subscriber and to otherwise accept the subscription request; and
wherein the quality of service of messages are controlled based on a comparison of the message increment to be caused by the subscription request with a remaining throughput capacity of the publish/subscribe engine comprises: the subscription request is rejected if the message increment to be caused by the subscription request is greater than the remaining throughput capacity of the publish/subscribe engine and to otherwise accept the subscription request.

15. The apparatus according to claim 9, further comprising:
- a buffer space for subscribers;
- wherein a difference between an amount of messages which are sent during a certain time interval and an amount of messages that a subscriber can receive to be less than the buffer space set is controlled by the buffer space for subscribers.

16. The apparatus according to claim 9, wherein the message publishing rate is constant or regularly varies.

* * * * *